US012781946B2

(12) United States Patent
Tooyama et al.

(10) Patent No.: US 12,781,946 B2
(45) Date of Patent: Nov. 3, 2026

(54) INDICATION DEVICE HAVING A PARTIONED CASE WITH TWO COMPARTMENTS AND LIGHT BLOCKING PLATE WITH LIGHT TRANSMISSIVE DESIGN PORTIONS

(71) Applicant: Nippon Seiki Co., Ltd., Niigata (JP)

(72) Inventors: Koji Tooyama, Niigata (JP); Koji Haraga, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 0 days.

(21) Appl. No.: 19/398,187

(22) Filed: Nov. 24, 2025

(65) Prior Publication Data

US 2026/0168649 A1 Jun. 18, 2026

(30) Foreign Application Priority Data

Dec. 17, 2024 (JP) ................................ 2024-220704

(51) Int. Cl.
*B60Q 3/14* (2017.01)
*F21V 11/16* (2006.01)
*F21W 106/00* (2018.01)
*F21Y 115/10* (2016.01)

(52) U.S. Cl.
CPC ................ *F21V 11/16* (2013.01); *B60Q 3/14* (2017.02); *F21W 2106/00* (2018.01); *F21Y 2115/10* (2016.08)

(58) Field of Classification Search
CPC ... B60Q 3/10; B60Q 3/12; B60Q 3/14; B60Q 3/16; B60Q 3/18; F21W 2106/00; F21V 11/16
USPC .................................. 362/23.01–23.22, 489
See application file for complete search history.

(56) References Cited

U.S. PATENT DOCUMENTS

| | | | | |
|---|---|---|---|---|
| 7,441,913 | B2 * | 10/2008 | Bayersdorfer | F21V 21/00 362/240 |
| 11,273,758 | B2 * | 3/2022 | Wang | B60K 35/22 |

FOREIGN PATENT DOCUMENTS

| | | |
|---|---|---|
| JP | 2017-181158 A | 10/2017 |

* cited by examiner

*Primary Examiner* — Robert J May
(74) *Attorney, Agent, or Firm* — Rimon P.C.

(57) ABSTRACT

To provide an indication device that can improve degrees of freedom of arrangement position of and the appearance of a design portion. An indication device includes a circuit board, a case, and a light blocking plate. In a space enclosed by the circuit board, the light blocking plate, and a peripheral wall portion of the case, a partition wall is formed to divide the space into a first compartment not including a center position when the indication device is viewed from the front, and a second compartment including the center position. When a first electronic component is mounted in the first compartment, a second electronic component is mounted at a location on the circuit board in the second compartment not to be located at the center position. A first design portion and a second design portion, both being light transmissive, are formed in the light blocking plate corresponding to the mount positions of the first electronic component and the second electronic component, respectively.

8 Claims, 8 Drawing Sheets

INDICATION DEVICE HAVING A PARTIONED CASE WITH TWO COMPARTMENTS AND LIGHT BLOCKING PLATE WITH LIGHT TRANSMISSIVE DESIGN PORTIONS

CROSS-REFERENCE TO RELATED APPLICATIONS

This application claims the benefit of foreign priority to Japan Patent Application No. 2024-220704 filed on Dec. 17, 2024, the entire contents of which are hereby incorporated by reference.

TECHNICAL FIELD

The present disclosure relates to an indication device, and more particularly to an indication device including a circuit board on which electronic components are mounted.

BACKGROUND ART

A typical indication device for vehicles includes a plurality of indicators (design portions) such as an indication lamp and a warning lamp, as well as a speed indication portion, a fuel level indication portion, and the like (see, for example, Patent Document 1).

Examples of the indication lamps include directional indication lamps. As directional indication lamps, a right-turn indication lamp and a left-turn indication lamp are often arranged symmetrically in the left-right direction (symmetrically in the up-down direction) with respect to the center of an indication device, for example. In addition, a high beam indication lamp (which turns on when lights are set to a high state) and an automatic high beam lamp (which turns on when the lights are set to a mode in which automatic switching between the high state and the low state is performed depending on presence or absence of an object ahead, etc.) are desirably arranged in the indication device in a balanced manner in the left-right direction (or in the up-down direction), because these lamps have similar designs.

PRIOR ART DOCUMENT

Patent Document

Patent Document 1: Japanese Unexamined Patent Application Publication No. 2017-181158 (FIG. 1)

SUMMARY OF INVENTION

Technical Problem

However, the number and types of indicators provided at the indication device vary depending on the vehicle model and grade, which may impose restrictions on the arrangement position. For this reason, when indicators with similar designs or indicators with designs which are symmetric in the left-right direction (or symmetric in the left-right direction) are provided in an indication device, these indicators may not be arranged symmetrically (in the left-right direction, for example) about the center of the indication device, and thus detract from the appearance of the indication device.

The present disclosure has been made in consideration of the above circumstances, and an object of present disclosure is to provide an indication device that can improve degrees of freedom of arrangement position of and the appearance of a design portion.

Solution to Problem

To solve the above-mentioned problems, an indication device of the present disclosure includes a circuit board, a case housing the circuit board therein, and a light blocking plate provided at a front opening of the case to face the circuit board. The case includes a partition wall dividing a space enclosed by the circuit board, the light blocking plate, and a peripheral wall portion of the case, into a first compartment not including a center position when the indication device is viewed from the front, and a second compartment including the center position. When a first electronic component is mounted on the circuit board in the first compartment, a second electronic component is mounted at a location on the circuit board in the second compartment not to be located at the center position, and a first design portion and a second design portion, both being light transmissive, are formed in the light blocking plate corresponding to the mount positions of the first electronic component and the second electronic component, respectively. When the first electronic component is not mounted on the circuit board in the first compartment, the second electronic component is arranged at the center position on the circuit board, and a third design portion being light transmissive is formed in the light blocking plate corresponding to the mount position of the second electronic component.

Here, the first electronic component refers to an electronic component mounted on the circuit board in the first compartment, and the second electronic component refers to an electronic component mounted on the circuit board in the second compartment. Therefore, the first electronic component and the second electronic component refer to electronic components that are mounted on the circuit board in different compartments (at different mount positions), and the first electronic component and the second electronic component may be the same electronic component or different electronic components.

Advantageous Effects of Invention

According to the indication device of the present disclosure, it is possible to improve degrees of freedom of arrangement position of and the appearance of the design portion.

DESCRIPTION OF EMBODIMENTS

Figure 1:
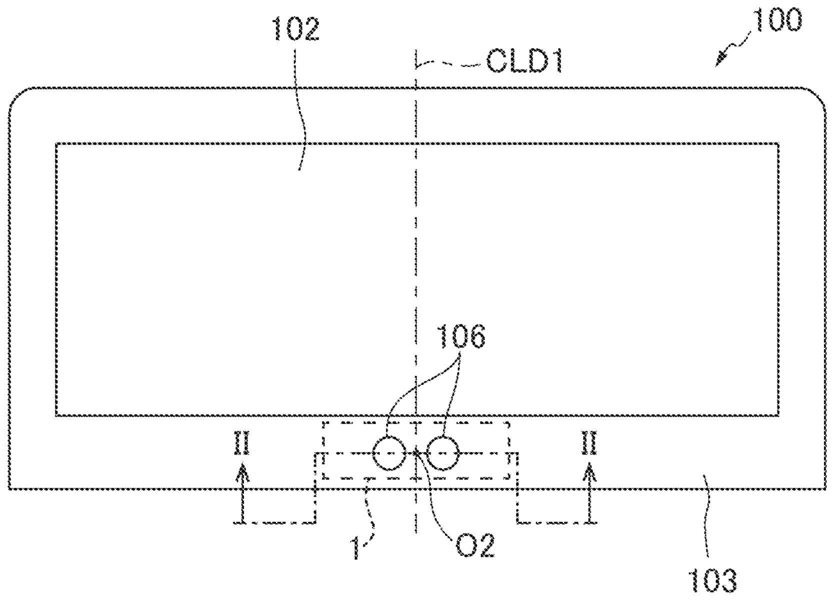
FIG. 1 is a front view of a vehicle meter according to an embodiment.
Figure 2:
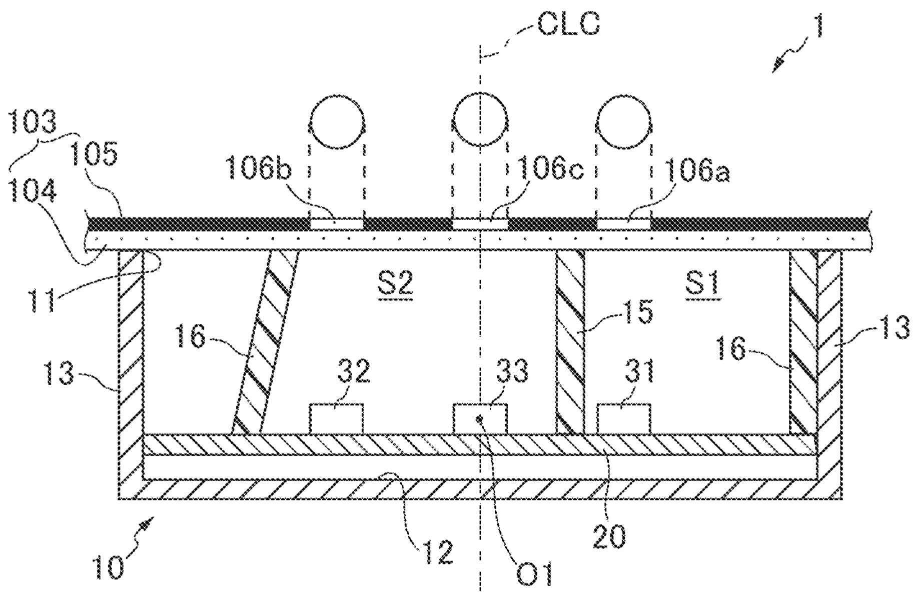
FIG. 2 is a cross-sectional view of an indication device in which one LED light source is mounted in a first compartment and two LED light sources are mounted in a second compartment.
Figure 3:
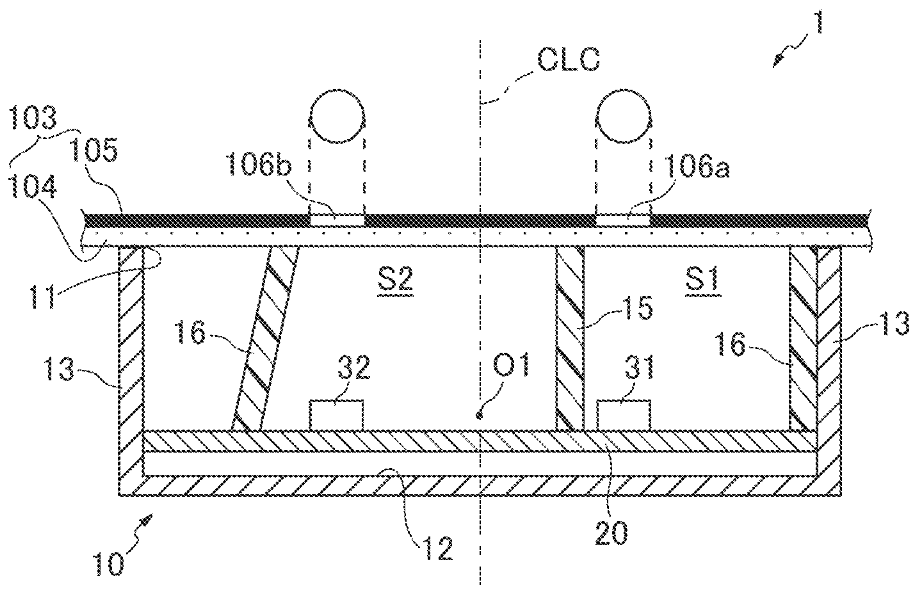
FIG. 3 is a cross-sectional view of the indication device taken along a line II-II of FIG. 1, illustrating a case where one LED light source is mounted in each of the first compartment and the second compartment.
Figure 4:
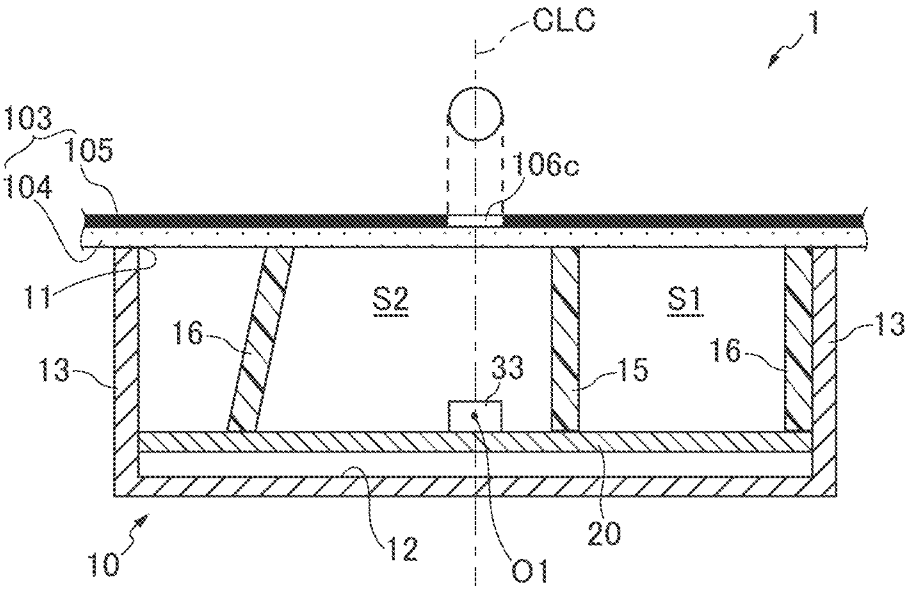
FIG. 4 is a cross-sectional view of the indication device in which no LED light source is mounted in the first compartment and an LED light source is mounted only in the second compartment.

An example of an indication device of the present disclosure will be described in detail with reference to the drawings. FIG. 1 is a front view of a vehicle meter including the indication device. FIGS. 2 to 4 are cross-sectional views of indication devices in which LED light sources described later are mounted at different mount positions. FIG. 3 is a cross-sectional view of the indication device taken along a line II-II in FIG. 1, illustrating a case where two LED light sources are provided on the circuit board, and FIG. 4 illustrates a case where only one LED light source is provided.

As illustrated in FIG. 1, a vehicle meter 100 is provided with a liquid crystal display 102 that can display vehicle speed information and the operating status of an advanced driver assistance system (ADAS). A frame portion 103 is provided to enclose the display 102. The frame portion 103 is formed by using a light blocking material (a light blocking plate), and thus the frame portion 103, which covers the display 102 except for an information display portion, is not noticeable for a user viewing the vehicle meter 100 from the front.

As illustrated in FIGS. 1 to 4, an indication device 1 is provided at the center bottom of the vehicle meter 100. The indication device 1 generally includes a case 10, a circuit board 20, and a frame portion 103.

The case 10 has a box shape that can house the circuit board 20, and has a front opening 11 formed on the front side (the upper side in FIGS. 2 to 4) of the vehicle meter 100 (the display 102). The circuit board 20 is installed near a bottom 12 of the case 10.

As described above, the frame portion 103 is formed by using a light blocking material, and more specifically, is formed by using a sheet material 105 with a light blocking ability bonded to a surface of a light transmissive plate material 104. A light transmissive design portion 106 can be formed on the sheet material 105 with a light blocking ability. FIG. 3 illustrates a state in which two design portions **106*a* and 106*b* are formed. In the embodiment, the design portion 106*a* is referred to as a first design portion, and the design portion 106*b*** is referred to as a second design portion.

The case 10 is installed in the vehicle meter 100 such that the front opening 11 of the case 10 is covered by the bottom of the frame portion 103. Therefore, the bottom of the frame portion 103 faces the circuit board 20.

The case 10 is installed at a position such that the center (a center line) of the case 10 in a front view coincides with the center (a center line) of the vehicle meter 100 (the display 102 and the frame portion 103) in a front view. More specifically, the case 10 is installed in the vehicle meter 100 (the frame portion 103) such that a center line CLC of the case 10 (see FIGS. 2 to 4) is included in a plane including a center line CLD1 (see FIG. 1) that passes through the center of the vehicle meter 100 (the display 102 and frame portion 103) and extends in the up-down direction along the screen of the display 102.

In the case 10, a partition wall 15 that divides the internal space of the case 10 (the space enclosed by the circuit board 20, side walls (peripheral wall portions) 13 of the case 10, and the frame portion 103) into at least two parts, is provided. The partition wall 15 divides the internal space of the case 10 into a first compartment S1 that does not include the center of the case 10 (a position through which the center line CLC passes, a center position), and a second compartment S2 that includes the center of the case 10 (the position through which the center line CLC passes, the center position). In addition to the partition wall 15, other partition walls 16, 16 that are installed near the side wall 13 of the case 10 and that partition the space near the edge portion of the circuit board 20, are provided in the case 10.

Various electronic components are mounted on the upper surface of the circuit board 20. Examples of the electronic component include a light emitting element such as an LED light source. In FIG. 3, an LED light source (a first electronic component) 31 is mounted on the circuit board 20 in the first compartment S1, and an LED light source (a second electronic component) 32 is mounted on the circuit board 20 in the second compartment S2. As illustrated in FIG. 3, when the LED light source 31 is mounted in the first compartment S1, the LED light source 32 mounted in the second compartment S2 is mounted at a position such that the mount position of the LED light source 31 in the first compartment S1 and the mount position of the LED light source 32 in the second compartment S2 are line-symmetrical with respect to the center line CLC of the case 10 (or point-symmetrical with respect to a point O1 on the center line CLC in FIG. 3).

The first design portion **106*a* described above is formed at a position in the sheet material 105 directly above the mount position of the LED light source 31 (a position corresponding to the mount position of the LED light source 31). The second design portion 106*b* is formed at a position in the sheet material 105 directly above the mount position of the LED light source 32 (a position corresponding to the mount position of the LED light source 32). The sheet material 105 has a light blocking ability, while the first design portion 106*a* and the second design portion 106*b* are light transmissive. Therefore, when the LED light source 31 in the first compartment S1 is turned on, the user can visually recognize the light passing through the first design portion 106*a*. When the LED light source 32 in the second compartment S2 is turned on, the user can visually recognize the light passing through the second design portion 106*b***.

When the LED light source 31 in the first compartment S1 is turned off, the first design portion **106*a* becomes less visible to the user and does not draw user's attention, regardless of whether the LED light source 32 in the second compartment S2 is on. This is because the frame portion 103 is formed by using the light blocking material, the first compartment S1 and the second compartment S2 are partitioned by the partition wall 15, and thus the light from the LED light source 32 in the second compartment S2 is prevented from entering the first compartment S1. This effect can also be achieved when the LED light source 32 in the second compartment S2** is turned off.

As describe above, in the indication device 1 according to the embodiment, the LED light source 31 in the first compartment S1 and the LED light source 32 in the second compartment S2 are mounted at positions arranged line-symmetrically with respect to the center line CLC of the case 10 (or point-symmetrically with respect to the point O1 on the center line CLC illustrated in FIG. 3), and therefore the first design portion 106*a* and the second design portion 106*b* provided corresponding to the LED light source 31 and the LED light source 32, respectively, are also formed at positions arranged line-symmetrically with respect to the center line CLD1 of the vehicle meter 100 (the display 102 and frame portion 103) (or point-symmetrically with respect to a point O2 on the center line CLD1 illustrated in FIG. 1). Therefore, when the LED light sources 31 and 32 are turned on or off, the user visually recognizes the first design portion 106*a* and the second design portion 106*b* at positions on the left and right sides of the center line CLD1 of the vehicle meter 100 arranged in a balanced manner. As a result, it is possible to improve the appearance of the vehicle meter 100 (and the design portion 106).

When the two LED light sources 31 and 32 and the two design portions 106*a* and 106*b* are provided in the indication device 1 as illustrated in FIG. 3, balanced arrangement in the left-right direction with respect to the center line CLD1 of the vehicle meter 100 can be achieved. However, when only one LED light source is mounted in the indication device 1, typically, the number of LED light sources is reduced to one by leaving one of the LED light source 31 in the first compartment S1 and the LED light source 32 in the second compartment S2, and removing the other from the circuit board 20. This is because a common case 10 is often used for different vehicle models, and the shape of the case 10 or the position of the partition wall 15 or the like cannot be easily changed depending on the mount position of the LED light source.

On the assumption that only one LED light source is mounted, in the indication device 1 according to the embodiment, the partition wall 15 is provided such that the first compartment S1 is a compartment (space) that does not include the center of the case 10 (the position through which the center line CLC passes) and the second compartment S2 is a compartment (space) that includes the center of the case 10 (the position through which the center line CLC passes).

FIG. 4 is a cross-sectional view of the indication device 1 in which only one LED light source is mounted in the case 10. An LED light source (a second electronic component) 33 is mounted at a position in the second compartment S2, which is the center of the circuit board 20 (the point O1 on the center line CLC). Furthermore, a third design portion 106*c* is formed at a position in the sheet material 105 directly above the mount position of the LED light source 33. By forming the third design portion 106*c* in the sheet material 105 in this manner, the third design portion 106*c*, which becomes visible to the user when the LED light source 33 is turned on, is visually recognized on the center line CLD1 of the vehicle meter 100. As a result, it is possible to improve the appearance of the vehicle meter 100 (and the design portion 106).

Furthermore, a common case 10 can be used for both of the case where only one LED light source 33 is mounted in the case 10 and the case where two LED light sources 31 and 32 are mounted, and thus there is no need to prepare cases with different shapes each supporting a different mount position and a different number of LED light sources, and universal use of the component (the case 10) can be achieved. Furthermore, despite using the common case 10, the design portion 106 can be freely set, and thus the degree of freedom in arranging the design portion 106 can be increased.

The design portion 106 (a light transmissive portion) can be easily formed by subjecting the sheet material 105 to a printing process or the like. Therefore, the formation positions of the design portions 106 can be easily changed in accordance with the mount positions of the LED light sources 31 to 33. Furthermore, even if a plurality of sheet materials 105 each having a different formation position of the design portion 106 are prepared in advance, there is no risk of the cost increase of the vehicle meter 100. In addition, artwork design of the circuit board 20 is prepared such that a board on which two LED light sources 31 and 32 are mounted and a board on which only one LED light source 33 is mounted can be prepared from a single artwork design, and thus there is no risk of increasing costs due to preparing different artwork designs.

Figure 5:
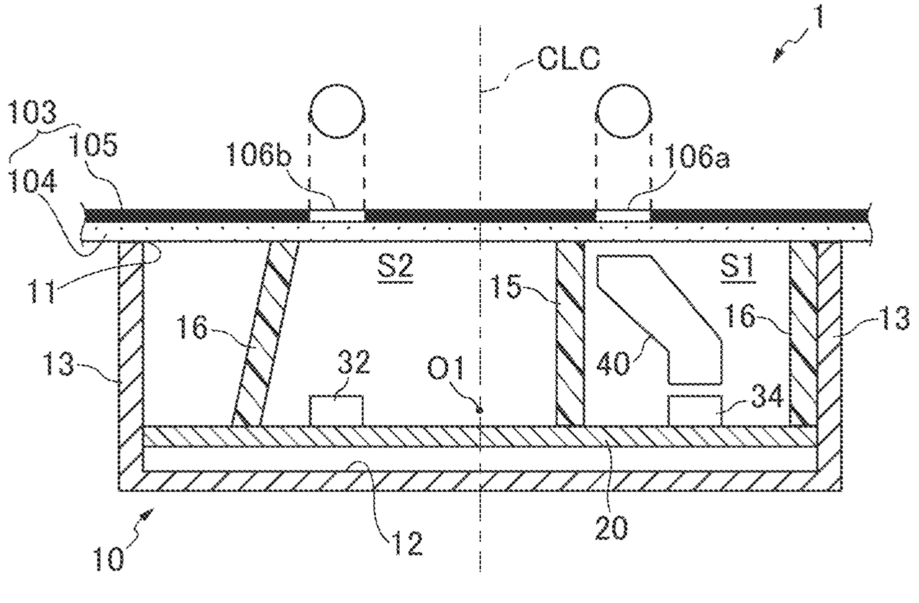
FIG. 5 is a cross-sectional view of the indication device in which a photosensor is mounted in the first compartment and an LED light source is mounted in the second compartment.

FIG. 5 illustrates a cross-sectional view of the indication device 1 in which a photosensor (a first electronic component) 34 is mounted instead of the LED light source 31 in the first compartment S1 illustrated in FIG. 3. Even when the photosensor (first electronic component) 34 is mounted as illustrated in FIG. 5, the same case as the case 10 illustrated in FIGS. 2 to 4 can be used. Note that, even if the mount position of the photosensor 34 in the first compartment S1 is different from the mount position of the LED light source 31 (even if the mount position of the photosensor (the first electronic component) 34 is offset from the formation position of the first design portion 106*a* with respect to the front direction of the indication device 1), by installing, in the first compartment S1, a light guide 40 that is bent such that a lower end is located directly above the photosensor 34 and an upper end is located directly below the first design portion 106*a*, it is possible to effectively guide, to the photosensor 34, the light incident through the first design portion 106*a*, without changing the position of the first design portion 106*a* (without compromising the positional balance between the first design portion 106*a* and the second design portion 106*b*).

A light guide may be installed in the second compartment S2. The light guide installed in the second compartment S2 allows the light from the LED light source to be effectively transmitted to the design portion 106, and allows the user to easily visually recognize the design portion 106, in both of the case where the LED light source is located at the center of the circuit board 20 (the position where the center line CLC passes) when viewed from the front and the case where the LED light source is located at a position other than the center of the circuit board 20 (the position where the center line CLC passes).

Figure 6:
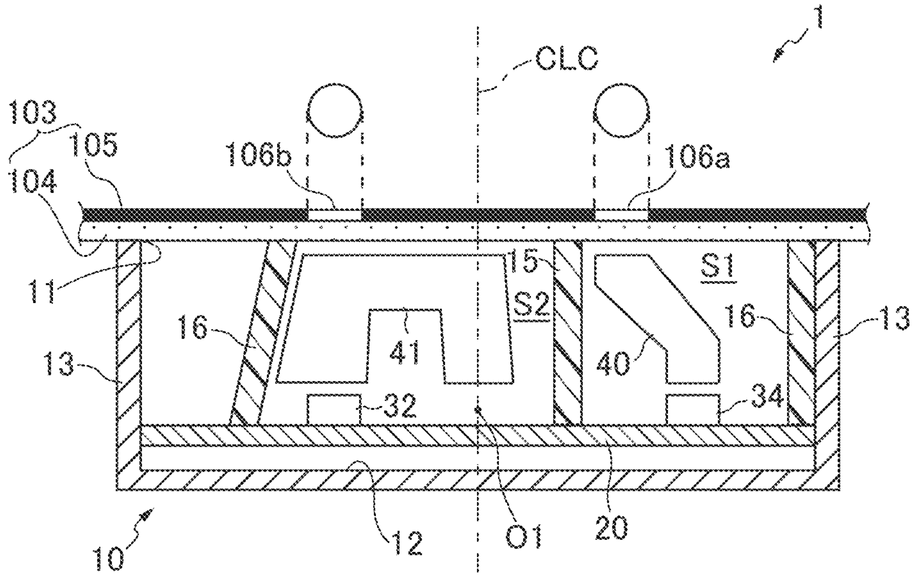
FIG. 6 is a cross-sectional view of the indication device in which a photosensor is mounted in the first compartment and an LED light source and a light guide are installed in the second compartment.

FIG. 6 is a cross-sectional view illustrating a state in which a light guide 41 is provided in the second compartment S2 of the indication device 1 illustrated in FIG. 5. When the LED light source 32 is provided on the circuit board 20, the light guide 41 installed in the second compartment S2 makes it possible to effectively guide the light from the LED light source 32 to the second design portion 106*b*.

Figure 7:
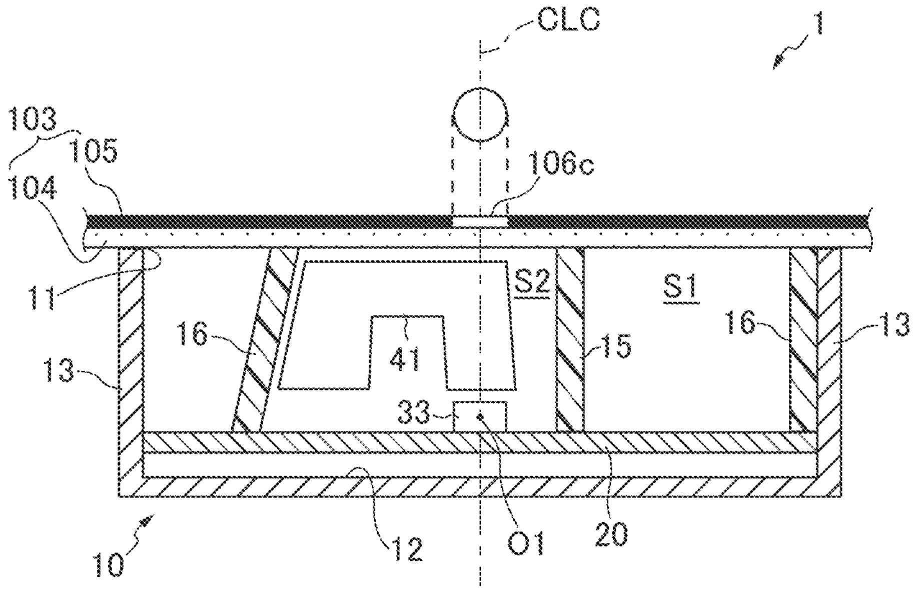
FIG. 7 is a cross-sectional view of the indication device in which no photosensor is mounted in the first compartment and an LED light source and a light guide are installed in the second compartment.

On the other hand, when the LED light source 33 is arranged at the position through which the center line CLC passes (the position of the point O1) in the second compartment S2, as illustrated in FIG. 7, the case 10 and light guide 41 illustrated in FIG. 6 can also be used to effectively guide the light from the LED light source 33 to the third design portion 106*c*. The same or similar effect can be achieved when the light guide 41 is installed in the second compartment S2 of the indication device 1 illustrated in FIG. 3.

The indication device of the present disclosure has been described above using the vehicle meter 100 including the indication device 1 as an example, but the indication device of the present disclosure is not limited to the configuration of the indication device 1 described in the embodiment.

For example, the indication device 1 according to the embodiment has been described as being installed on the frame portion 103 of the vehicle meter 100, but the indication device of the present disclosure is not limited to the configuration in which the indication device is installed on the frame portion 103. For example, when the display 102 is not a liquid crystal display but a pointer-type indication meter including a dial and a pointer portion, the sheet material 105 of the indication device 1 can be formed as the dial, and the indication device 1 can be installed in the center part of the vehicle meter 100 (the part inside the frame portion 103), so that the design portion 106 can be used as an indicator (indication lamp, warning lamp) provided in the vehicle meter 100.

Specifically, by using, as the design of the design portion 106, designs of directional indication lamps (horizontally flipped versions of the same design) and designs of high beam indication lamp and the like (similar designs), the left and right directional indication lamps or the like in the vehicle meter 100 can be arranged line-symmetrically with respect to the center line CLD1 (or point-symmetrically with respect to the point O2), in a balanced manner. Furthermore, by arranging an indication lamp or the like at a position on the center line CLD1 (or at the position of the point O2), the indicator can be arranged at the central position in a balanced manner. As a result, when the user visually recognizes the indicators such as an indication lamp and a warning lamp, the user recognizes the indicators that are arranged in a balanced manner, without visual discomfort regarding turning on and off of the indicators. Thus, improved visibility can be achieved. Furthermore, arranging the indicators in this manner can improve the appearance of the vehicle meter 100.

Furthermore, the common case 10 can support different arrangement positions of the indicator, and thus universal use of the component (the case 10) can be achieved. In addition, despite using the common case 10, the degree of freedom in arranging the design portion 106 can be increased.

Figure 8:
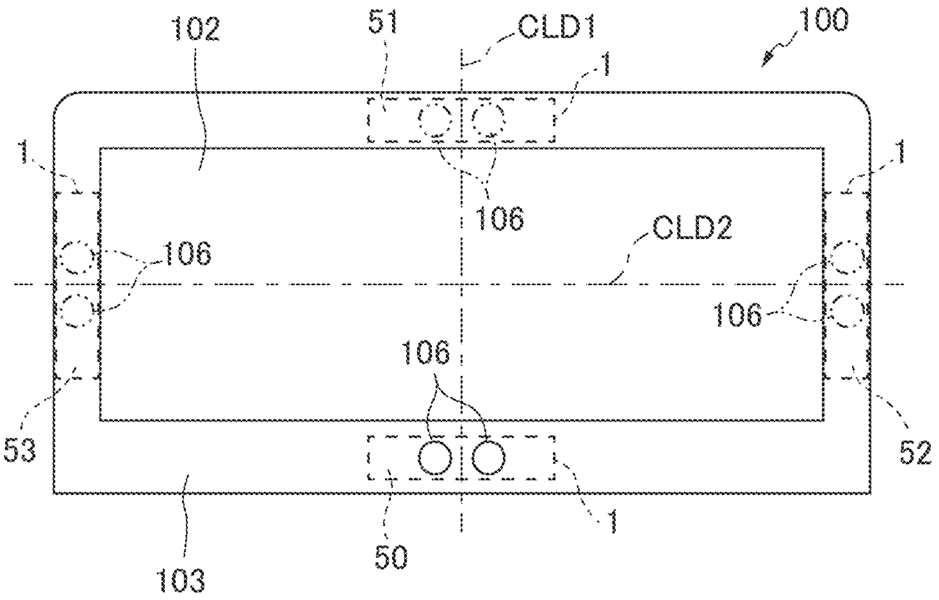
FIG. 8 is a front view illustrating installation examples of the indication device in a vehicle meter.

In the indication device 1 according to the embodiment, the case where the indication device 1 is installed at a position in the frame portion 103 on the lower side of the vehicle meter 100 has been described, but the installation position of the indication device of the present disclosure is not limited to a position in the frame portion 103 on the lower side of the vehicle meter 100. For example, as illustrated in FIG. 8, the installation position of the indication device 1 may not be a position 50 in the frame portion 103 on the lower side of the vehicle meter 100, and may be a position 51 in the frame portion 103 on the upper side. In this arrangement, the two design portions 106 are also arranged in a balanced manner on the left and right sides of the center line CLD1 of the vehicle meter 100, and thus the same or similar effects as those of the indication device 1 according to the embodiment can be achieved.

In addition, as illustrated in FIG. 8, the indication device 1 may be arranged at a position 52 in the frame portion 103 on the right side of the vehicle meter 100 or at a position 53 in the frame portion 103 on the left side of the vehicle meter 100, and two design portions 106 may be arranged one above the other. In this arrangement of the two design portions 106, the two design portions 106 are arranged in a balanced manner on the upper and lower sides of a center line CLD2 of the vehicle meter 100 extending in the left-right direction, and thus the same or similar effects as those of the indication device 1 according to the embodiment can be achieved.

Although, in the indication device 1 according to the embodiment, the LED light sources 31 to 33 and the photosensor 34 are mounted as electronic components mounted on the circuit board 20, the electronic components mounted on the circuit board 20 are not limited to these components and may be different electronic components.

REFERENCE SIGNS LIST

1 . . . Indication device
10 . . . Case
11 . . . Front opening (of case)
12 . . . Bottom (of case)
13 . . . Side wall (of case)
15, 16 . . . Partition wall (of case)
20 . . . Circuit board
31 . . . LED light source (first electronic component)
32, 33 . . . LED light source (second electronic component)
34 . . . Photosensor (first electronic component)
40 . . . Light guide (for photosensor)
41 Light guide (for LED light source)
50, 51, 52, 53 . . . Position (in frame portion where indication device is installed)
100 . . . Vehicle meter
102 . . . Display
103 . . . Frame portion
104 . . . Plate material
105 . . . Sheet material
106 . . . Design portion
106*a* . . . First design portion
106*b* . . . Second design portion
106*c* . . . Third design portion
O1, O2 . . . Center point
S1 . . . First compartment
S2 . . . Second compartment
CLD1 . . . Center line (of vehicle meter extending in up-down direction)
CLD2 . . . Center line (of vehicle meter extending in left-right direction)
CLC . . . Center line (of case)

The invention claimed is:

1. An indication device, comprising:

a circuit board;

a case housing the circuit board therein; and a light blocking plate provided at a front opening of the case to face the circuit board, wherein the case includes a partition wall dividing a space enclosed by the circuit board, the light blocking plate, and a peripheral wall portion of the case, into a first compartment not including a center position when the indication device is viewed from the front, and a second compartment including the center position, when a first electronic component is mounted on the circuit board in the first compartment, a second electronic component is mounted at a location on the circuit board in the second compartment not to be located at the center position, and a first design portion and a second design portion, both being light transmissive, are formed in the light blocking plate corresponding to mount positions of the first electronic component and the second electronic component, respectively, and when the first electronic component is not mounted on the circuit board in the first compartment, the second electronic component is arranged at the center position on the circuit board, and a third design portion being light transmissive is formed in the light blocking plate corresponding to a mount position of the second electronic component.

2. The indication device according to claim 1, wherein a formation position of the first design portion in the light blocking plate and a formation position of the second design portion in the light blocking plate are arranged point-symmetrically with respect to the center position.

3. The indication device according to claim 1, wherein a formation position of the first design portion in the light blocking plate and a formation position of the second design portion in the light blocking plate are arranged line-symmetrically with respect to a straight line passing through the center position along the light blocking plate.

4. The indication device according to claim 1, wherein design of the first design portion and design of the second design portion are the same or similar.

5. The indication device according to claim 1, wherein the first electronic component is an electronic component that receives light, and the second electronic component is an electronic component that emits light.

6. The indication device according to claim 5, wherein a light guide is provided in the first compartment, and the light guide guides, to the first electronic component, light passed through the first design portion and entering the case.

7. The indication device according to claim 6, wherein a formation position of the first design portion and the mount position of the first electronic component are offset from each other with respect to a front direction of the indication device, and the light guide has a bent shape to connect the formation position of the first design portion and the mount position of the first electronic component.

8. The indication device according to claim 1, wherein the indication device is installed in a vehicle meter including a display, and a straight line passing through the center position is included in a plane passing through a center position of the display when viewed from the front.

* * * * *